UNITED STATES PATENT OFFICE.

FREDERICK H. EICHBAUM, OF DETROIT, MICHIGAN, ASSIGNOR, BY MESNE ASSIGNMENTS, OF TWO-THIRDS INTEREST TO JOHN T. SALTER, TRUSTEE, OF CHICAGO, ILLINOIS.

IMPROVEMENT IN PROCESSES FOR THE MANUFACTURE OF ILLUMINATING-GAS.

Specification forming part of Letters Patent No. 164,822, dated June 22, 1875; reissue No. 7,024, dated April 4, 1876; application filed March 8, 1876.

*To all whom it may concern:*

Be it known that I, FREDERICK H. EICHBAUM, of Detroit, in the county of Wayne and State of Michigan, have invented a new Improvement in the Process for the Manufacture of Illuminating-Gas; and I do hereby declare that the following is a full and exact description of the same.

The object I have in view is the production of a better and more uniform quality of illuminating-gas, in a convenient and cheap way, by enriching, to a desired degree, the gases which may be produced from non-resinous woods, or woods or other suitable vegetable substances which do not produce gases of sufficient candle-power for commercial uses; and my invention therein consists in the production of a fixed or permanent illuminating-gas of a required candle-power at a single operation, without the use of steam or of reheaters, by the simultaneous destructive distillation of wood and a definite quantity of hydrocarbons at about the same temperature.

In order to enable those skilled in the art to use my process, I proceed to describe the same more particularly.

When such woods are in the act of distillation, or in the act of evolving illuminating-gas in whatever apparatus may be convenient or suitable for the purpose, I combine with such gases by any proper mechanical means, in such quantities as may be desired, gases produced from the distillation of hydrocarbons, it being essential that both of the operations of distillation should go on at the same time, and that the combination of both gases should take place in the same vessel and under the same temperature. A convenient method of performing this process upon a small scale will be found in taking a retort adapted to be heated to a very high temperature, and having a stand-pipe, with a valve giving an opening into the air, and placing in the retort a certain quantity, by weight, of well-seasoned hard wood, and opening the valve in the stand-pipe so as to give a communication into the air. When this wood has been distilling a few minutes, the products of which first distillation should be permitted to escape through into the air, the valve in the stand-pipe should be closed, so as to turn the products of distillation into the receiver or hydraulic main. At this time, the distillation having become active and gases freely evolved, I permit a certain flow of fluid hydrocarbon, regulated by valves in a pipe leading into such retort in and upon the wood placed therein.

If it is desired to have an illuminating-gas of sixteen-candle power, I use three to four gallons of crude naphtha, or its equivalent in gas-producing capacity or carbon, in any solid or fluid hydrocarbons, and one hundred and twenty-eight pounds of dry hard wood, in the manner before described. From this formula, which is not intended to be precisely fixed, as both crude naphtha and dry hard wood vary a little in their gas-producing capacities, but which is substantially correct, it will be perceived that the candle-power desired may be increased, either by increasing the quantity of hydrocarbon or by decreasing the quantity of wood, so that gas of any desirable candle-power may be produced.

In this operation it will be observed that the wood-gas, which is generated in large quantities in its passage toward the stand-pipe, combines with the gas produced from the hydrocarbon, which is comparatively small in bulk, and carries the same along with it, the two becoming thoroughly combined before reaching the stand-pipe.

An illuminating-gas of a fixed or permanent nature is thus evolved at one operation, at the same time and under a high temperature, in the evolution of which the wood-gas serves as a diluent and a vehicle to carry the gas from the hydrocarbon, which is evolved without deposit or waste, and both produced at the same time form a single gas of precisely the candle-power desired.

I do not wish to confine myself to any particular apparatus, as very many different kinds may be employed, one or more of which are of my own invention, and for which I am about making application for Letters Patent, my invention herein being simply the process before described.

Having thus described my process, what I claim therein as new, and for which I desire Letters Patent, is—

1. The process of producing, at a single operation, a fixed or permanent illuminating-gas of a required candle-power, by the simultaneous destructive distillation of wood, and a definite quantity of hydrocarbons at a high temperature, common to both distillations, substantially as described.

2. The process of procuring, at a single operation, a fixed or permanent illuminating-gas of a required candle-power, by causing the gas produced from the destructive distillation of wood at a high heat to combine with, carry along, and dilute, in the same vessel, the gas evolved from hydrocarbons in its passage to the stand-pipe, substantially as described.

Signed this 28th day of February, 1876.

FREDERICK H. EICHBAUM.

Witnesses:
CHARLES THURMAN,
R. N. DYER.